United States Patent Office 3,728,240
Patented Apr. 17, 1973

3,728,240
CURABLE LIQUID POLYENE-POLYTHIOL COMPOSITIONS CONTAINING ACRYLIC ACID COPOLYMERS
Edwin W. Lard, Bowie, Md., assignor to W. R. Grace & Co.
No Drawing. Application Nov. 2, 1970, Ser. No. 86,355, which is a continuation-in-part of abandoned application Ser. No. 74,185, Sept. 21, 1970. Divided and this application Dec. 6, 1971, Ser. No. 205,427
Int. Cl. B01j 1/00; C08d 1/00
U.S. Cl. 204—159.16
9 Claims

ABSTRACT OF THE DISCLOSURE

A curable liquid composition consisting essentially of:
(a) a polyene having the formula

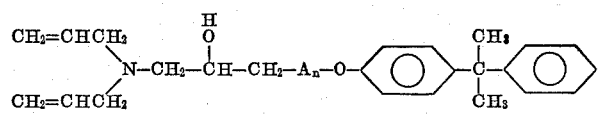 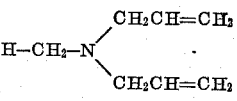

where A is

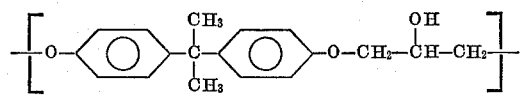

and $n$ is essentially 0 or greater (e.g., 0–20);
(b) a polythiol, the equivalent ratio of polyene to polythiol being about 1:0.5–1.5; and
(c) a member selected from a group consisting of a monomeric acid having the formula

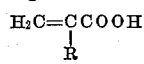

where R is H, $CH_3$, or $C_2H_5$ or a homopolymer of copolymer of such monomeric acid having an average molecular weight of about 140–1000, the group member constituting about 2–10% by weight of the composition.

The above composition can contain an effective amount of a photocuring rate accelerator.

CROSS REFERENCE TO RELATED APPLICATION

This is a division of application Ser. No. 86,355, filed Nov. 2, 1970, and a continuation-in-part of my copending application Ser. No. 74,185, filed Sept. 21, 1970, and now abandoned.

BACKGROUND OF THE INVENTION

Curable liquid compositions (i.e., liquid compositions which cure to produce solid polymers where admixed with an effective amount of a free radical generating reagent or where irradiated with an effective dose of high energy radiation) based upon; (a) a polyene ("Polyene No. 1") having the formula

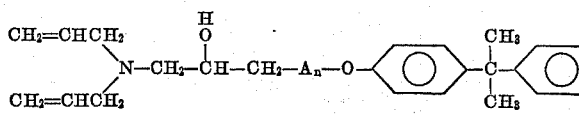 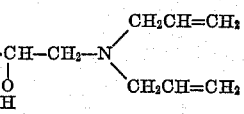

where A is

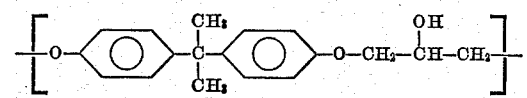

and $n$ has an average value of about 0 to about 20 (being an average based on a large number of molecules $n$ can be a whole number such as 1, 2, 3, or the like, a fraction such as 0.01, 0.1, 0.2, 0.999, or the like, or a mixed number such as 1.0001, 1.1, 3.2, 9.8, 19.99, or the like); and (b) a polythiol are known. U.S. patent application Ser. No. 779,596, filed Nov. 27, 1968 describes compositions of this type and their preparation. Such compositions which also contain an effective amount of a photocuring rate accelerator (a photosensitizer) and which can be cured by exposure to an effective dose of actinic light are also known. However, such compositions when applied to a substrate (e.g., a metallic surface, polymeric surface, wooden surface, paper surface, or the like) and cured (polymerized) thereon are relatively soft and easily scratched and are also easily stripped from the substrate. While such ease of stripping is desirable for some purposes such as forming a polymeric film by stripping the cured composition from the substrate on which the liquid composition was cured, this ease of stripping is undesirable for many other purposes (e.g., collapsible fuel tanks for aircraft, printing plates, protective films, and the like) where a firm bond is desired between the cured composition (polymer) and the surface of the substrate on which the liquid composition was cured.

Cured polymeric coatings which are relatively easily scratched are objectionable where using such coatings to protect a surface. Also, printing plates in which an image to be reproduced is incorporated into (or onto) a polymeric film bonded to a paper or metal or other substrate should be resistant to scratching.

It is important that the polymeric film adhere firmly to the substrate to which it (the film) is bonded where the film is applied to protect the substrate, where the coating is used as a printing plate, or where the polymer is use to bond pieces of metal (or other materials) together to make a container for a liquid such as fuel, water, or the like.

Compositions which when cured are firmly bonded to the surface of a substrate are especially useful for preparing collapsible fuel tanks for aircraft, collapsible water containers, printing plates (for either letterpress or offset printing), for use as coatings to protect metal surfaces (e.g., iron, and carbon steel surface) from corrosion by the atmosphere, and a protective coatings on the surfaces of wooden furniture and the like. I have found that the curable liquid composition of the instant invention can be used for such purposes with excellent results by applying the liquid composition to an appropriate surface and then curing the thus applied composition with a free radical generating reagent, by irradiation with high energy radiation such as an electron beam (e.g., from strontium-90 or a Van de Graff electron accelerator or the like), a beam of positive ions such as protons, alpha, particles, or deuterons, or a beam of neutrons, X-rays, gamma rays, or the like, or by exposure to actinic light (e.g., light having a wave length of about 2,000 A. to about 7,000 A. (ultraviolet and visible radiation) for a period of about a second or less to 2 hours or longer.

SUMMARY OF THE INVENTION

In summary, this invention is directed to a curable liquid composition consisting essentially of:
(a) The above-mentioned "Polyene No. 1";
(b) A polythiol, the equivalent ratio of polyene to polythiol being about 1:0.5–1.5; and
(c) A member selected from a group consisting of;
(i) a monomeric acid having the formula

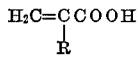

where R is H, $CH_3$, or $C_2H_5$; and (ii) a homopolymer or copolymer of said monomeric acid having an average molecular weight of about 140–1000, the group member constituting about 2–10% by weight of the composition.

DESCRIPTION OF PREFERRED EMBODIMENTS

In preferred embodiments of the composition described in the above summary:
(1) The average molecular weight of the polyene is about 500–650.
(2) The polythiol is pentaerythritol tetra-beta-mercaptopropionate

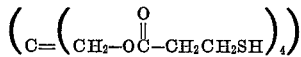

(3) The equivalent ratio of polyene to polythiol is about 1:1.
(4) The group member is monomeric arcylic acid.
(5) The group member constitutes about 2.5–4% of the composition.
(6) The composition contains an effective amount of a photocuring rate accelerator (e.g., dibenzosuberone, or the like).

DETAILED DESCRIPTION OF THE INVENTION

This invention is directed to a curable liquid composition which can be applied as a liquid coating to the surface of a substrate and cured thereon by treatment with a free radical generating reagent, or by irradiation with high energy radiation, or by exposure to actinic light to product a hard scratch resistant polymeric film strongly adhering to said surface.

Said curable liquid composition consists essentially of a mixture of; (a) the above-mentioned "Polyene No. 1"; (b) a polythiol; and (c) a monomeric acid having the formula

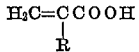

where R is H, $CH_3$, or $C_2H_5$ or a homopolymer of such monomeric acid (or a copolymer of such monomeric acids) having an average molecular weight of about 140–1000, the group member constituting about 2–10% by weight of the composition. An effective amount of a photocuring rate accelerator (photosensitizer or sensitizer) is included in the composition where actinic light is used to cure the composition. The photosensitizer need not be present (although its presence does no harm) where curing the composition with high energy radiation or with a free radical generating reagent.

"Polyene No. 1" can be prepared by reacting an epoxide compound having the formula

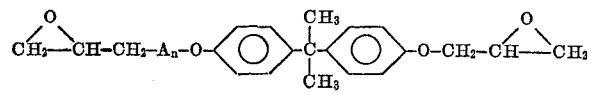

where A is

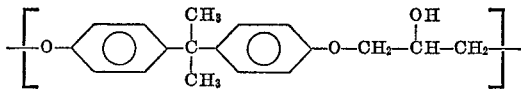

and $n$ is 0 or greater (e.g., 0–20, or 0–10, or 0–1) with diallylamine, 1 mole of the epoxy compound reacting with 2 moles of diallylamine.

The polythiol component of the composition of this invention has a molecular weight in the range from about 50 to about 20,000 and the general formula:

wherein $R_8$ is a polyvalent organic moiety free from reactive carbon-to-carbon unsaturation and $n$ is at least 2. The polyene:polythiol mole ratio is selected so as to provide a solid cured product where the curable liquid composition is cured at temperatures ranging from ordinary room temperature (e.g., ca. 15–35° C.) up to about 150° C. or somewhat higher.

Specifically, "polythiol" as used herein refers to simple or complex organic compounds having a plurality of pendant or terminally positioned —SH functional groups per molecule, said compound being free of reactive carbon-to-carbon unsaturation.

On the average the polythiol must contain 2 or more —SH groups/molecule and have a viscosity range of essentially 0 to 20 million centipoises (c.p.s.) at 70° C. as measured by a Brookfield viscometer either alone or when in the presenec of an inert solvent, aqueous dispersion or plasticizer. Operable polythiols in the instant invention usually have molecular weights in the range about 50 to about 20,000, and preferably from about 100 to about 10,000.

The polythiols operable in the instant invention may be exemplified by the general formula $R_8(SH)_n$ where $n$ is at least 2 and $R_8$ is a polyvalent organic moiety free from reactive carbon-to-carbon unsaturation. Thus $R_8$ may contain cyclic groupings and hetero atoms such as N, P or O and primarily contains carbon-carbon, carbon-hydrogen, carbon-oxygen, or silicon-oxygen containing chain linkages free of any reactive carbon-to-carbon unsaturation.

One class of polythiols operable with polyenes to obtain essentially odorless polythioether products are esters of thiol-containing acids of the formula HS—$R_9$—COOH where $R_9$ is an organic moiety containing no reactive carbon-to-carbon unsaturation with polyhydroxy compounds of structure $R_{10}(OH)_n$ where $R_{10}$ is an organic moiety containing no reactive carbon-to-carbon unsaturation, and $n$ is 2 or greater. These components will react under suitable conditions to give a polythiol having the general structure:

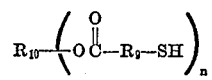

where $R_9$ and $R_{10}$ are organic moieties containing no reactive carbon-to-carbon unsaturation, and $n$ is 2 or greater.

Certain polythiols such as the aliphatic monomeric polythiols (ethane dithiol, hexamethylene dithiol, decamethylene dithiol, tolylene-2,4-dithiol, and the like), and some polymeric polythiols such as a thiol-terminated ethylcyclohexyl dimercaptan polymer, and the like, and similar polythiols which are conveniently and ordinarily synthesied on a commercial basis, although having obnoxious odors, are operable but many of the end products are not widely accepted from a practical, commercial point of view. Examples of the polythiol compounds preferred because of relatively low odor level include but are not limited to esters of thioglycolic acid (HS—$CH_2COOH$), α-mercaptopropionic acid (HS—$CH(CH_3)$—COOH and β-mercaptopropionic acid (HS—$CH_2CH_2COCH$) with polyhydroxy compounds such as glycols, triols, tetraols, pentaols, hexaols, and the like. Specific examples of the preferred polythiols include but are not limited to ethylene glycol bis (thioglycolate), ethylene glycol bis (β-mercaptopropionate), trimethylolpropane tris (thioglycolate), trimethylolpropane tri (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene-ether glycol (e.g. Pluarocol P2010, Wyandotte Chemical Corp.) and β-mercaptopropionic acid by esterification.

The preferred polythiol compounds are characterized by a low level of mercaptan-like odor initially, and after reaction, give essentially odorless polythioether and products which are commercially attractive and practically useful resins for both indoor and outdoor applications.

Although the mechanism of the reaction by which the composition of this invention is cured is not completely understood, it has been found that said curing reaction can be initiated by; (a) high energy radiation (e.g., about 0.1–4 megarads); (b) exposure to an actinic light source where a suitable photosensitizer is incorporated into the composition; and (c) admixing the composition and a chemical free radical generating agent. Such free radical generating agents include oxygen, ozone, chlorine, organic peroxides and hydroperoxides, peracids, persulfates, inorganic peroxides, and azo compounds such as azobisisovaleronitrile. Certain of these compounds may be made more effective and efficient if used in conjunction with co-agent curing rate accelerators. Examples of accelerated systems include benzoyl peroxide with dimethylaniline as an accelerator, cumene hydroperoxide with cobalt naphthenate as an accelerator, and the like. Included in this class are reagents or components which are generated in situ in the composition. Curing periods may be varied, but the reactions are generally relatively fast. Conversions from liquid to solid state generally occur within a few minutes, often within a few seconds or less.

The chemical free radical generating reagent is usually added in an amount ranging from about 0.0005 to about 25% by weight of the curable composition, with the preferred range being from about 0.005% (or 0.05%) to about 5% or more by weight.

Where using actinic light to cure the composition, by a proper choice of type and concentration of photocuring rate accelerator for initiation, the curing period required for conversion of the polyene:polythiol composition from the liquid to the solid state may be varied greatly as desired. In combination with suitable accelerator or retarders, the curing period may vary from about a second or less to about 30 minutes or more. In general, short curing periods are achieved in applications where thin films of curable composition are required, such as in the field of coatings whereas the long curing periods are achieved and desired where more massive layers of compositions are required, such as in the field of elastomeric sealants.

A class of actinic light useful herein is ultraviolet light and other forms of actinic radiation which are normally found in radiation emitted from the sun or from artificial sources such as Type RS sunlamps, carbon arc lamps, xenon arc lamps, mercury vapor lamps, tungsten halide lamps and the like. Ultraviolet radiation may be used most efficiently if the photocurable polyene:polythiol composition contains a suitable photocuring rate accelerator. Curing periods may be adjusted to be very short and hence commercially economical by proper choice of ultraviolet source, photocuring rate accelerator and concentration thereof, temperature and molecular weight, and reactive group functionality of the polyene and polythiol. Curing periods of less than about 1 second duration are possible, especially in thin film applications such as desired for example in coatings and adhesives.

Conventional curing inhibitors or retarders which may be used in order to stabilize the components or curable compositions so as to prevent premature onset of curing may include hydroquinone; p-tert.-butyl catechol; 2,6-di-tert.-butyl-p-methylphenol; phenothiazine; N-phenyl-2-naphthylamine; inert gas atmospheres such as helium, argon, nitrogen and carbon dioxide; vacuum (the substantial absence of oxygen); and the like.

Specifically useful herein are chemical photocuring rate accelerators such as benzophenone, acetophenone, acenapthene-quinone, o-methoxy benzophenone, thioxanthen-9-one, xanthen-9-one, 7-H-benz (de) anthracen-7-one, dibenzosuberone, 1-naphthaldehyde, 4,4'-bis (dimethylamino) benzophenone, fluorene-9-one, 1'-acetonaphthone, 2'-acetonaphthone, anthraquinone, 1-indanone, 2-tert.-butyl anthraquinone, valerophenone, hexanophenone, 8-pheylbutyrophenone, p - morpholinopropiophenone, 4-morpholinobenzophenone, 4' - morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthrenone, 3-acetylphenanthrene, 3-acetylindole 1,3,5-triacetylbenzene, and the like including blends thereof, to greatly reduce the exposure times.

The photocuring rate accelerators are usually added in an amount ranging from about 0.0005 to about 50% by weight of the photocurable composition, with a preferred range being from about 0.005 to about 25% by weight. Preferred photocuring rate accelerators are the aldehyde and ketone carbonyl compounds having at least one aromatic nucleus attached directly to the

group.

The compounding of the components prior to curing may be carried out in several ways. For example, the polyene, polythiol, photocuring rate accelerator, the aforesaid monomeric acid having the formula

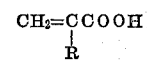

or a polymer or copolymer of said acid and any other additive can be admixed and charged into an aerosol can, drum, tube, or cartridge for subsequent use.

Another useful method of compounding is by admixing, in contact with the atmosphere but in the absence of actinic radiation, a composition consisting of the polyene, an antioxidant (to inhibit spontaneous oxygen-initiated curing), a polythiol, a photocuring rate accelerator (ultraviolet sensitizer or photoinitiator) and said monomeric acid, or a polymer or copolymer of said acid. This composition may be stored in the dark for extended periods of time, but on exposure to actinic radiation (e.g., ultraviolet light, sunlight, etc.) it will cure controllably and in a very short time period to a solid polythioether product.

The instant invention will be better understood by referring to the following specific but nonlimiting examples. It is understood that said invention is not limited by these examples which are offered merely as illustrations; it is also under that modifications can be made without departing from the spirit and scope of the invention.

EXAMPLE I (Preparation of a "Polyene No. 1")

Five moles of Epon 828 (an epoxy compound having the formula

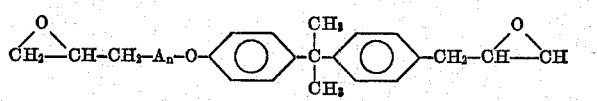

where A is

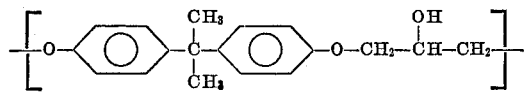

and n is a number greater than 0 and less than 1 and having an average value such that the average molecular weight of the epoxy compound is about 390 and twelve moles of diallylamine were admixed under an atmosphere of nitrogen and maintained at about 80–90° C. (under said atmosphere of nitrogen) for about 2–3 hours. Then unreacted diallyl amine was distilled off under reduced pressure (ca. 1–10 mm. of mercury absolute) and the residue (substantially pure "Polyene No. 1") was recovered.

EXAMPLE II (Preparation of control)

A composition was prepared by admixing the "Polyene No. 1" of Example I and pentaerythriol tetra-beta-mercaptopropionate in a mole ratio of 1:1 (since each is tetrafunctional—the polyene being a tetraene and the pentaerythritol tetra-beta-mercaptopropionate being a tetrathiol—this is also an equivalent ratio of 1:1) to form a first mixture. The mixture was admixed with about 0.1% by weight of dibenzosuberone to form a second mixture.

(Polymerization of control)

A portion of the second mixture was applied as a coating to a smooth glass surface; the thickness of the coating was adjusted so that on curing the coating would constitute a film of solid polymer having a thickness of about 2 mm. The thus formed coating was cured by exposure for about 5 minutes to actinic light from a Westinghouse sunlamp positioned about a foot from the coating.

(Tests on control)

Two replications of the above-described polymerization of the control were run to yield a total of three smooth glass substrates with a coating of the cured polymer film, each film having a thickness of about 2 mm., thereon.

Two of the films were stripped from the glass substrates; one was tested for hardness using ASTM designation D–2240 and the other for tensil modulus using ASTM designation D–412.

The third film which had been left on the glass substrate (surface) on which it was formed was tested to determine its (the films) adhesion to the glass surface using ASTM designation D–1000.

The results of these tests are:

Hardness ("D") _____ 47
Tensil modulus _____p.s.i__ 10,500
Adhesion _____pound per inch__ 0.2

EXAMPLE III (Preparation, polymerization, and testing new composition)

The general procedure set forth in Example II for "preparation of control" was repeated (using 5 replications or runs with each run being made in triplicate) but said general procedure was modified by admixing a quantity (said quantity varying from run to run as indicated in the following table) of acrylic acid with the second mixture to form, in each instance, a third mixture. These third mixtures were applied to glass substrates. The thickness of each coating was adjusted to yield a film which after curing would have a thickness of about 2 mm., and the coatings were cured and tested according to the general procedures used in Example II. The results of these tests are presented in Table I below:

TABLE I

| Run No. | Percent acrylic acid | Hardness ("D") | Tensil modulus, p.s.i. | Adhesion, pounds per inch |
|---|---|---|---|---|
| 1 | 0.25 | 50 | 39,000 | 5.0 |
| 2 | 0.5 | 60 | 52,700 | 7.2 |
| 3 | 2.5 | 65 | 162,000 | 7.4 |
| 4 | 5 | 68 | 146,000 | 7.3 |
| 5 | 10 | 68 | 153,000 | 7.3 |

EXAMPLE IV

The general procedure of Example III was repeated, however, in each run irradiation with a high energy electron beam from a Van de Graff electron accelerator (rather than exposure to ultraviolet light) was used to cure the composition. The total radiation dose was 0.8 megarad. The results obtained are presented in Table II, below:

TABLE II

| Run No. | Percent acrylic acid | Hardness ("D") | Tensil modulus, p.s.i. | Adhesion, pounds per inch |
|---|---|---|---|---|
| 1 | 0.25 | 48 | 38,000 | 4.8 |
| 2 | 0.5 | 61 | 52,500 | 7.1 |
| 3 | 2.5 | 64 | 162,500 | 7.3 |
| 4 | 5 | 69 | 150,500 | 7.4 |
| 5 | 10 | 68 | 158,000 | 7.2 |

EXAMPLE V

The general procedure of Example IV was repeated. However, in this instance the procedure was modified by omitting the photocuring rate accelerator (dibenzosuberone).

The results obtained in the runs of this example was substantially identical with those obtained in the corresponding runs of Example IV.

EXAMPLE VI

The general procedure of Example III was repeated; however in each run, benzoyl peroxide, a free radical generating reagent (rather than exposure to ultraviolet light) was used to cure the composition. In each run this was accomplished by admixing the composition to be tested with 0.2% of benzoyl peroxide and 0.3% dimethylaniline before applying the composition to the glass plates. The results obtained were substantially the same as those obtained in the corresponding runs in Example III.

EXAMPLE VII

The general procedure of Example VI was repeated; however, in this instance the procedure was modified by omitting the photosensitizer (dibenzosuberone).

The results obtained in the runs of this example were substantially identical with those obtained in the corresponding runs of Example VI.

In another series of runs using the general procedure of Example III the acrylic acid was replaced with methacrylic acid. The results obtained were substantially indistinguishable from those obtained in Example III, supra, with acrylic acid. Substantially the same results were obtained in other runs in which the acrylic acid was replaced with: (a) $HC_2=C(C_2H_5)COOH$; (b) homopolymers of acrylic acid having average molecular weights of about 140–720; (c) homopolymers of methacrylic acid having average molecular weights of about 172–860; (d) homopolymers of $HC_2=C(C_2H_5)COOH$ having average molecular weights of about 200–1000; (e) copolymers of at least two members selected from the group consisting of; (i) acrylic acid; (ii) methacrylic acid; and (iii) $HC_2=C(C_2H_5)COOH$, such copolymers having average molecular weights of about 145–980.

In another series of runs using the general procedure of Example III the composition was polymerized by exposure to sunlight on a clear day for about 10 min. The results were substantially identical with those obtained in Example III.

In another series of runs using the general procedure of Example III the mole ratio of "Polyene No. 1" to the pentaerythritol tetra-beta-mercaptopropionate was about 1:0.5. The results were substantially the same as those obtained in Example III.

In another series of runs using the general procedure of Example III the mole ratio of "Polyene No. 1" to the pentaerythritol was about 1:1.5. The results obtained were substantially the same as those obtained in Example III.

In another series of runs using the general procedure of Example III, the quantity of dibenzosuberone was varied from about 0.005% to about 25% by weight (based on the weight of the "second mixture" described supra (i.e., the mixture of "Polyene No. 1," polythiol, and photocuring rate accelerator—dibenzosuberone in this instance)). The results were substantially the same as those obtained in Example III.

In another series of runs using the general procedure of Example III, the dibenzosuberone was replaced with amounts varying from about 0.005% to about 25% by weight (based on the weight of the "second mixture" described supra) of the above-mentioned photocuring rate accelerators. The results of such runs were substantially the same as those obtained in Example III.

In another series of runs using the general procedure of Example III the pentaerythritol tetra-beta-mercaptopropionate was replaced with the above-mentioned polythiols using such quantity of polythiol that the equivalent ratio of polyene ("Polyene No. 1") to polythiol fell within a range of about 1:0.5–1.5. The results were substantially the same as those obtained in Example III.

In another series of runs using the general procedure of Example III the glass substrate (surface) was replaced with: (a) an aluminum surface; (b) a steel surface; (c) a copper surface; (d) a galvanized steel surface; (e) a brass surface; (f) a wooden surface; (g) a paper surface; and (h) a polyvinyl chloride surface. The hardness and tensil modulus were, in each instance, substantially the same as the values obtained in the corresponding run of Example III, but the adhesions of the cured polymer films to the metallic surface, alloy surface, wooden surface, and paper surface were greater than the adhesion of the corresponding film to the glass surface values—being about 7.9–8.8 pounds per inch vs. 5–7.4 pounds per inch where using glass in Example III. Adhesion to the polyvinyl chloride surface was about the same as to the glass surface.

Another series of runs using the general procedure of Example VII but modified by; (a) replacing the benzoyl peroxide with effective amounts of the above-mentioned free radical generating reagents; (c) in some runs omitting the co-agent curing rate accelerators; and (d) in some instance replacing the dimethylaniline co-agent curing rate accelerator with an effective amount of a cobalt napathenate co-agent curing rate accelerator.

The results were substantially identical with those of corresponding runs in Example VII except that the curing rate was somewhat slower in the absence of co-agent curing rate accelerator.

In another series of runs using the general procedure of Example III, the "Polyene No. 1" prepared in Example I was replaced with a "Polyene No. 1" made by the reaction of epoxy compound having the formula

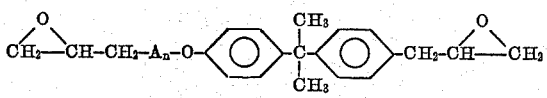

where A is

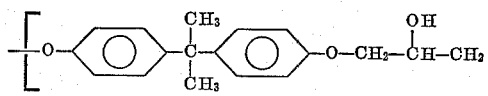

and $n$ is about 5 with diallylamine.

The results of these runs were substantially identical with the results obtained in Example III.

As used herein, the term "p.s.i." means pounds per square inch.

As used herein, the term "percent (%)" means parts per hundred and the term "parts" means parts by weight unless otherwise defined where used.

As used herein, the term "mole" has its generally accepted meaning, that is, a mole of a substance is that quantity of the substance which contains the same number of molecules of the substance as there are atoms of carbon in 12 grams of pure $^{12}C$.

The term "equivalent" as applied to "Polyene No. 1" means ¼ mole of said polyene because each molecule of this polyene contains 4 olefinic ($-C=CH_2$) groups.

As used herein, the term "liquid" in the expression "curable liquid composition" means that the composition before being cured is a liquid at a processing temperature selected within a range of about 15° C. to about 150° C., i.e., the maximum viscosity (measured on a Brookfield viscometer) of such "curable liquid composition" is about 20 million centipoises at about 150° C.

The term "equivalent" as applied to a polythiol means that proportionate fractional quantity of the polythiol which contains 33.07 grams of —SH group. Thus, an equivalent of pentaerythritol tetra-beta-mercaptopropionate is ¼ mole of said mercaptopropionate because each molecule of said mercaptopropionate contains 4 —SH groups (i.e., a mole of this compound contains 132.28 grams of —SH).

In a polythiol compound having the formula

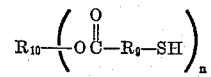

an equivalent is ½ mole where $n$ is 2; ⅓ mole where $n$ is 3, ¼ mole where $n$ is 4, and ⅕ mole where $n$ is 5.

The terms "reactive unsaturated carbon-to-carbon groups" and "reactive carbon-to-carbon unsaturation" means groups (having carbon-to-carbon unsaturation) which will react under proper conditions as set forth herein with thiol groups to yield a thioether linkage

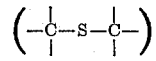

as contrasted to the term "unreactive carbon-to-carbon unsaturation" which means

groups found in aromatic nucleii (cyclic structures exemplified by benzene, pyridine, anthracene, and the like) which do not under the same conditions react with thiols to give thioether linkages.

I claim:

1. In a curable liquid composition consisting essentially of (a) a polyene having the formula

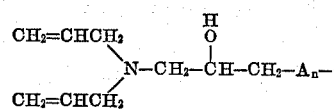 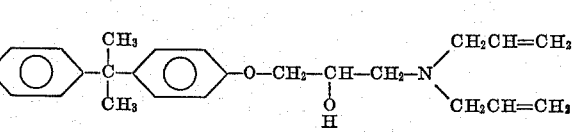

where A is

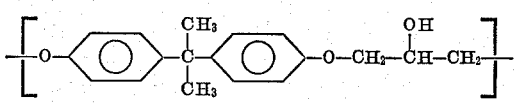

where $n$ is 0–12; and (b) a polythiol free of reactive carbon-to-carbon unsaturation and containing at least 2 thiol groups per molecule, said polythiol having a molecular weight of about 50–20,000 and a viscosity of essentially 0–20 million centipoises, the equivalent ratio of polyene to polythiol being about 1:1.5–1.5, the improvement comprising the presence of a copolymer of acids selected from the group consisting of acids having the formula

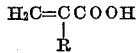

where R is H, $CH_3$, or $C_2H_5$, said copolymers having an average molecular weight of about 140–1,000 and constituting about 2–10% by weight of the composition.

2. The composition of claim 1 in which the average molecular weight of the polyene is about 500–650.

3. The composition of claim 1 in which the polythiol is pentaerythritol tetra-beta-mercaptopropionate.

4. The composition of claim 1 in which the equivalent ratio of polyene to polythiol is about 1:1.

5. The composition of claim 1 in which the copolymer is a copolymer of acrylic acid and methacrylic acid.

6. The composition of claim 1 in which the copolymer constitutes about 2.5–4% of the composition.

7. The composition of claim 1 in which the composition contains an effective amount of a photocuring rate accelerator.

8. The composition of claim 7 in which the photocuring rate accelerator is dibenzosuberone.

9. The composition of claim 1 in which $n$ is a number greater than 0 and less than 1.

References Cited
UNITED STATES PATENTS

| | | | |
|---|---|---|---|
| 3,662,022 | 5/1972 | Lard | 204—159.18 |
| 3,578,614 | 5/1971 | Wszoley | 260—13 |
| 3,661,744 | 5/1972 | Kehr et al. | 204—159.14 |

MURRAY TILLMAN, Primary Examiner

R. B. TURER, Assistant Examiner

U.S. Cl. X.R.

117—93.31, 124 E, 128.4, 132 R, 132 B, 138.8 UA, 148, 155 R, 155 UA; 204—159.14, 159.15; 260—470, 570.6, 874, 875